United States Patent
Takayama et al.

(10) Patent No.: US 10,297,090 B2
(45) Date of Patent: May 21, 2019

(54) INFORMATION PROCESSING SYSTEM, APPARATUS AND METHOD FOR GENERATING AN OBJECT IN A VIRTUAL SPACE

(71) Applicant: NINTENDO CO., LTD., Kyoto (JP)

(72) Inventors: Takahiro Takayama, Kyoto (JP); Yuya Sato, Kyoto (JP); Sosuke Takada, Kyoto (JP); Mahito Idehara, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 15/620,477

(22) Filed: Jun. 12, 2017

(65) Prior Publication Data
US 2018/0357831 A1 Dec. 13, 2018

(51) Int. Cl.
*G06T 19/20* (2011.01)
*G06T 13/80* (2011.01)
*A63F 13/5258* (2014.01)
*A63F 13/577* (2014.01)
*A63F 13/5375* (2014.01)

(52) U.S. Cl.
CPC .......... *G06T 19/20* (2013.01); *A63F 13/5258* (2014.09); *A63F 13/5375* (2014.09); *A63F 13/577* (2014.09); *G06T 13/80* (2013.01); *G06T 2219/2004* (2013.01); *G06T 2219/2012* (2013.01); *G06T 2219/2016* (2013.01)

(58) Field of Classification Search
None
See application file for complete search history.

(56) References Cited

U.S. PATENT DOCUMENTS

| 5,966,141 A * | 10/1999 | Ito | G06T 17/10 |
|---|---|---|---|
| | | | 345/473 |
| 8,314,789 B2 * | 11/2012 | Fitzmaurice | G06F 3/04815 |
| | | | 345/419 |
| 2005/0197186 A1 * | 9/2005 | Ohta | A63F 13/06 |
| | | | 463/30 |
| 2006/0132482 A1 * | 6/2006 | Oh | G06T 13/80 |
| | | | 345/419 |

(Continued)

OTHER PUBLICATIONS

"The Legend of Zelda: Spirit Tracks", released Dec. 2009, gameplay video found at https://www.youtube.com/watch?v=DqXvnVKAbAg, May 14, 2014; five captured video frames 1-5.*

(Continued)

*Primary Examiner* — Xiao M Wu
*Assistant Examiner* — Steven Z Elbinger
(74) *Attorney, Agent, or Firm* — Nixon & Vanderhye P.C.

(57) ABSTRACT

An example information processing apparatus includes a processing system configured to control the information processing apparatus to: determine a base and a base direction in a virtual space; and determine whether an object can be generated in the virtual space relative to the base in the base direction. Based on determining that the object can be generated relative to the base in the base direction, an animated indicator may be displayed indicating at least the base direction for generating the object in the virtual space. Based on determining that a specified condition is satisfied, the object may be progressively generated relative to the base in the base direction.

24 Claims, 13 Drawing Sheets

(56) References Cited

U.S. PATENT DOCUMENTS

| | | | |
|---|---|---|---|
| 2008/0207324 A1* | 8/2008 | Hiroshige | A63F 13/10 463/33 |
| 2011/0234493 A1* | 9/2011 | Kravits | G06F 3/0334 345/160 |
| 2014/0101601 A1* | 4/2014 | Tang | G06F 17/30241 715/781 |
| 2016/0328887 A1* | 11/2016 | Elvezio | G06T 19/20 |
| 2016/0361641 A1 | 12/2016 | Koizumi et al. | |

OTHER PUBLICATIONS

Nintendo, The Legend of Zelda: Spirit Tracks, released Dec. 2009, gameplay video found at https://www.youtube.com/watch?v=DqXvnVKAbAg, May 14, 2014.

Nintendo, The Legend of Zelda: Breath of the Wild, released Mar. 3, 2017, description of game at https://en.wikipedia.org/wiki/The_Legend_of_Zelda:_Breath_of_the_Wild, retrieved Jun. 12, 2017.

Nintendo, The Legend of Zelda: Spirit Tracks, released Dec. 2009, description of game at https://en.wikipedia.org/wiki/The_Legend_of_Zelda:_Spirit_Tracks, retrieved Jun. 12, 2017.

* cited by examiner

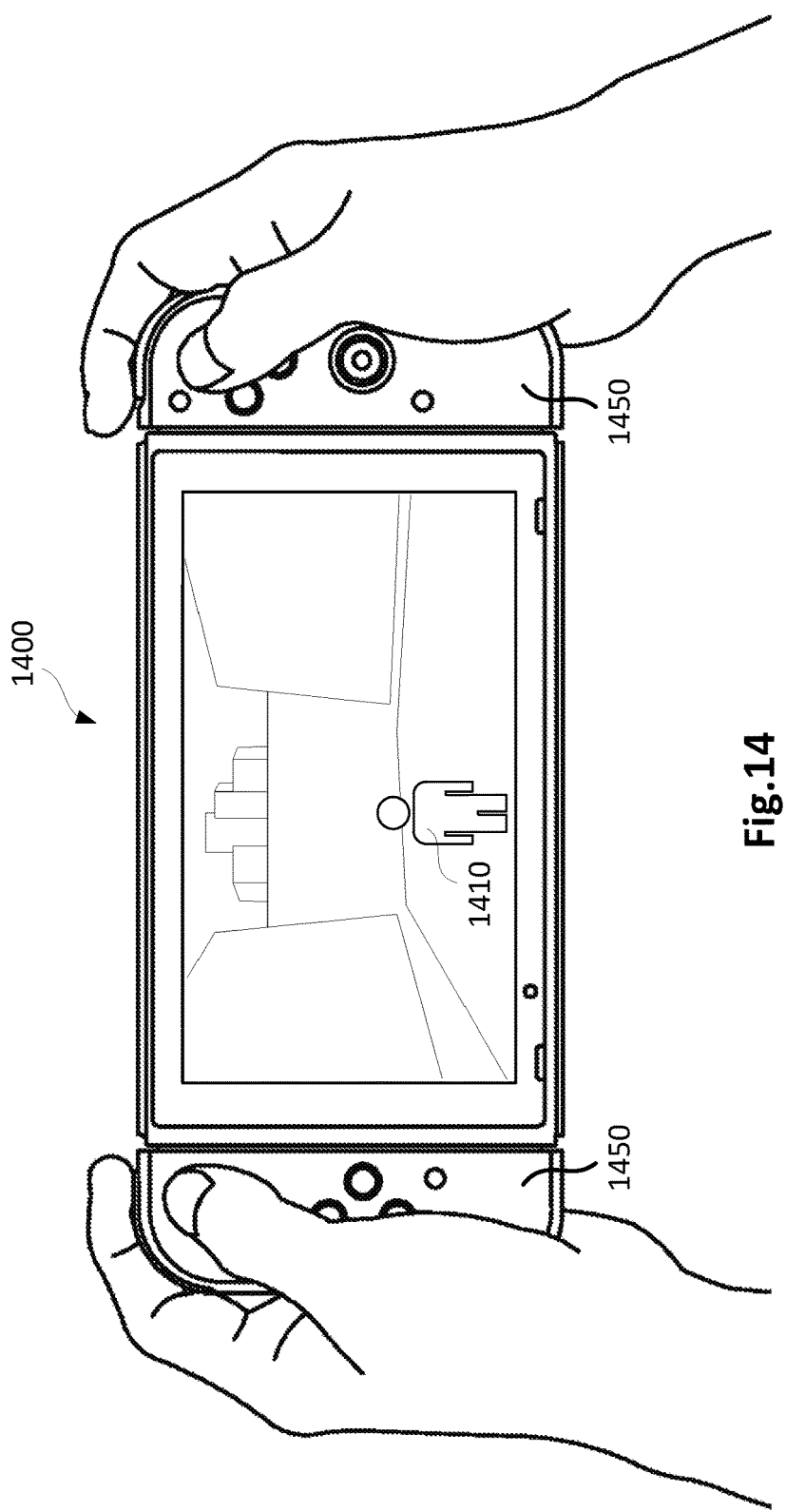

INFORMATION PROCESSING SYSTEM, APPARATUS AND METHOD FOR GENERATING AN OBJECT IN A VIRTUAL SPACE

FIELD

The present disclosure generally relates to generating an object in a virtual space and, more particularly, to providing an indicator for an object to be generated in a virtual space before the object is generated in the virtual space.

BACKGROUND AND SUMMARY

Computers can be programmed to generate realistic three-dimensional (3D) virtual worlds and spaces. Using one or more control devices, users are able to navigate through and interact with these virtual spaces. For example, game machines, both hand-held and consoles, allow players to play sophisticated games in which movements and other actions of one or more game characters are controlled in 3D game worlds. In some games, players can add new objects to the game world to assist a game character in achieving a particular goal or reaching a particular part of the game world. However, adding two- and three-dimensional objects in a 3D virtual space can be challenging due to the inability of a user to accurately visualize how the object will be added in the virtual space and/or how the object will interact with other objects in the virtual space when the object is added. If an object is incorrectly placed in the virtual space, the user will need to remove the object and repeat the process for adding the object until the object is placed in the virtual space as desired. The time needed to repeat such a process is not always available to or desirable for the user (e.g., during game play).

The present disclosure relates to, among other things, providing an indicator for an object to be generated in a virtual space and generating the object in the virtual space after the indicator is displayed. By way of illustration and without limitation, an example information processing apparatus may include a processing system configured to control the information processing apparatus to at least: determine a base and a base direction in a virtual space; and determine whether an object can be generated in the virtual space relative to the base in the base direction. Based on determining that the object can be generated relative to the base in the base direction, an animated indicator may be displayed indicating at least the base direction for generating the object in the virtual space. Based on determining that a specified condition is satisfied, the object may be progressively generated relative to the base in the base direction.

BRIEF DESCRIPTION OF DRAWINGS

FIG. 14 shows a non-limiting example information processing device with a display displaying an image of a virtual space.

DETAILED DESCRIPTION OF EXAMPLE EMBODIMENTS

Figure 1:
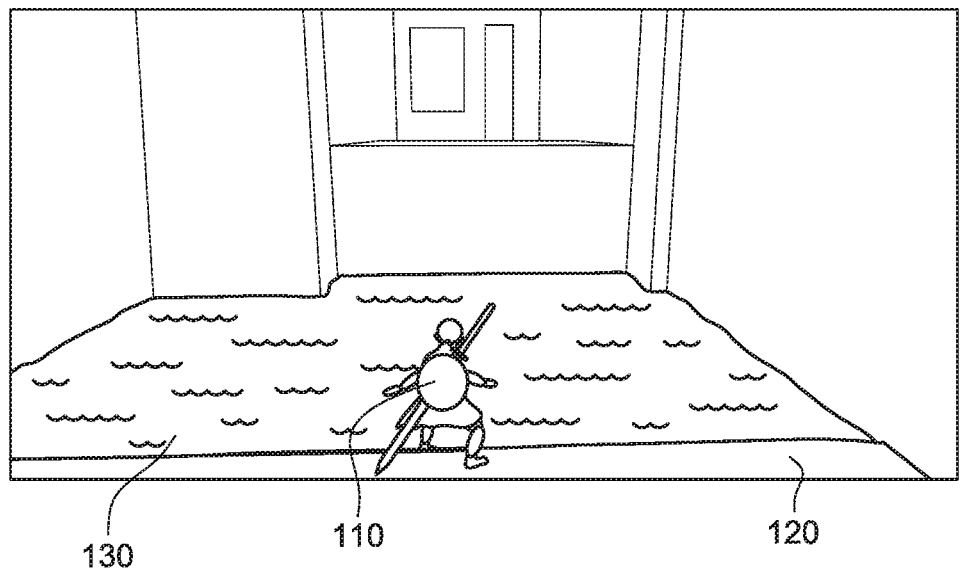
FIGS. 1-13 show non-limiting examples of displaying an indicator and generating an object in a virtual game world.

The figures discussed herein, and the various embodiments used to describe the principles of the present disclosure in this patent document are by way of illustration only and should not be construed in any way to limit the scope of the disclosure. Those skilled in the art will understand that the principles of the present disclosure may be implemented in any of a variety of suitably arranged electronic devices. Hereinafter, example embodiments of the present disclosure are described in detail with reference to the accompanying drawings. In the following description, detailed descriptions of well-known functions or configurations are omitted to avoid unnecessarily obscuring the subject matter of the present disclosure.

The present disclosure relates to generating objects, such as, but not limited to, blocks or pillars, in a virtual space (e.g., a virtual 3D world). Generating the objects may allow a player character in the virtual space to move between different areas of the virtual space, place obstacles in the virtual space, bypass obstacles in the virtual space, and/or move other objects in the virtual space. The technology described herein can provide, for example, an efficient manner to generate objects in the virtual space, present various characteristics of the object to be generated (e.g., its size, dimensions, location in the virtual world, etc.) before the object is generated, and/or provide an efficient manner to change the location and orientation of the object to be generated.

By way of illustration and without limitation, before an object is generated in the virtual space, a determination may be made as to whether the object can be generated at a designated location and, based on determining that the object can be generated at the designated location, an indicator may be displayed. The indicator may be displayed such that the indicator represents the object to be generated without having to generate the object in the virtual space. Displaying the indicator according to various illustrative embodiments of this disclosure may provide a user an indication of where the object will be placed in the virtual space, how the object will look in the virtual space, and/or how the object will be generated in the virtual space before the object is generated. In some instances, displaying the indicator before the object is generated may provide information about how the generated object will interact with other movable and/or non-movable objects in the virtual space when the object is generated. Displaying the indicator according to various illustrative embodiments of this disclosure may prevent the problem of an unexpected collision between the generated object and other objects or characters in the virtual space. In a non-limiting example embodiment, the indicator may be displayed so as to pass through movable objects. For example, an ice pillar can be generated even when generating the ice pillar will cause a collision with a movable treasure chest and, in this case, the indicator is displayed so as to pass through the treasure chest. As explained in greater detail below, a movable object such as a treasure chest can be moved in accordance with the growing pillar. In case of a collision with stationary (non-movable) objects (e.g., a ceiling, a floor), the indicator does not grow. The ice pillar cannot be generated and the ice pillar will not be generated at all. If the ice pillar collides with a stationary object after it is generated (e.g., the indicator didn't collide with the stationary object at the time of generation but the stationary object moves and collides with the ice pillar after the generation), the ice pillar is destroyed.

By way of illustration, for a game, a player character may come to a body of water in the virtual world which needs to be crossed. In accordance with the technology described herein, the player may generate an object to assist in crossing the water to reach another part of the game world. For example, the player may grow an ice pillar to which the character can jump from the current position. From the ice pillar, the character can then jump to the other part of the game world. The disclosed technology displays an indicator prior to generating the object so that the player can better ascertain various characteristics of the object to be generated (e.g., its size, dimensions, location in the virtual world, etc.). While the indicator is displayed, the player can change the location at which the object will be generated to, for example, confirm that it is positioned to allow for the jumping action described above. Displaying the indicator before the ice pillar is generated allows a user to accurate place the object at a desired location. Of course, the example ice pillar may be generated for purposes other than reaching different parts of a game world. For example, the ice pillar may be generated to provide an obstacle to other game objects in the virtual game world or to move one or more other objects in the virtual game world.

FIGS. 1-13 show non-limiting examples of displaying an indicator and generating an ice pillar 180 in a virtual game world during game play. While this example describes an ice pillar, the ice may take other shapes including blocks, cylinders and the like. FIG. 1 shows an image of a virtual game world as captured by a virtual camera. The virtual game world includes a player character 110 controlled based on progress of the game and/or user controls. The images of the virtual game world change with changes in the position and/or orientation of the virtual camera based on progress of the game, movement of the player character 110, and/or control of the virtual camera based on user controls. In FIG. 1, the player character 110 is standing on a first surface 120 and a second surface 130 is present adjacent to the first surface 120 and in front of the player character 110. For example, the first surface 120 may be ground (earth) or a floor and the second surface 130 may be a water surface covering a bottom surface at a certain distance below the water surface.

Figure 2:
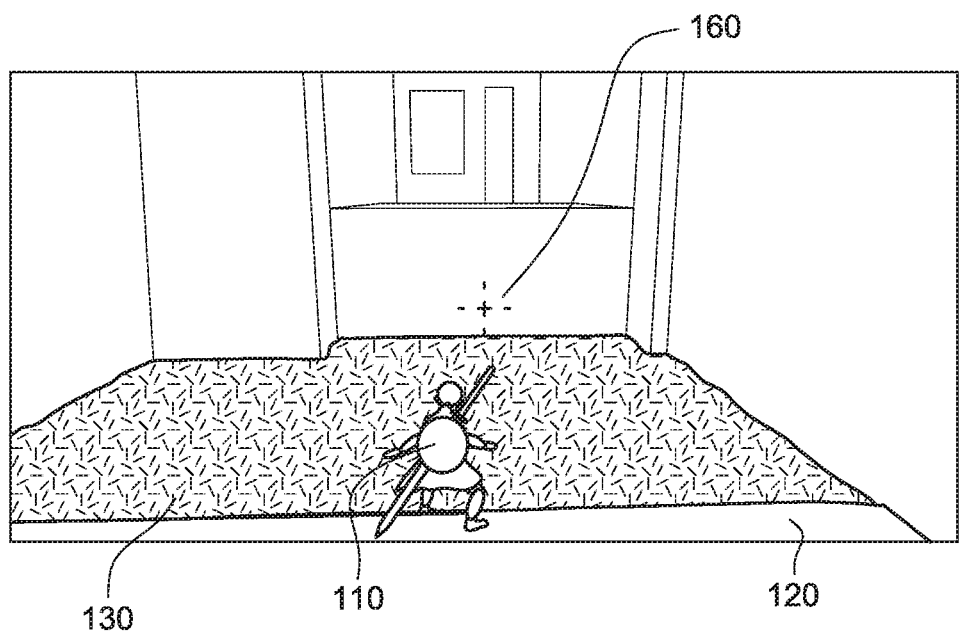

FIG. 2 illustrates a virtual space in an object generating mode. The object generating mode may be entered, for example, based on a user inputting a specified command (e.g., pressing a particular button on a remote control) during game play. As shown in FIGS. 1 and 2, when a user activates the object generating mode, a surface from which an object can be generated (e.g., the water surface 130) is displayed in a manner different from its normal appearance in the game world (e.g., with a different color, brightness, and/or surface texture) to show where it may be possible to generate the ice pillar 180. Textual and/or aural output may also provide information about the object generating mode and the possibility of generating objects. A user may also be provided with aural and/or visual feedback to indicate that it is not possible to generate a new object at the current location in the game world or in the current game conditions. While the virtual game world includes a plurality of different surfaces, in the example embodiment, only the surface on which the ice pillar 180 can be generated is changed when the object generating mode is activated.

As shown in FIG. 2, a marker 160 is displayed in an image of the virtual space. In an example embodiment, the marker 160 is displayed at the center of the image. The marker 160 may represent an imaging direction of the virtual camera in the virtual space. The marker 160 may correspond to an intersection of an imaging axis of the virtual camera capturing the displayed image and a surface of another object in the virtual space. The location in the virtual space corresponding to the location of the marker 160 may change if the orientation and/or location of the virtual camera in the virtual space is changed. The virtual camera orientation and/or location in the virtual space may change in response to movement of the player character 110, specific user controls for moving the camera and/or progress of a game. Of course, the location in the virtual space corresponding to the marker may be determined in ways not involving the imaging axis of the virtual camera. For example, the display of the marker may be invoked based on a specified user input and thereafter positioned based on marker movement inputs to a remote control.

Figure 3:
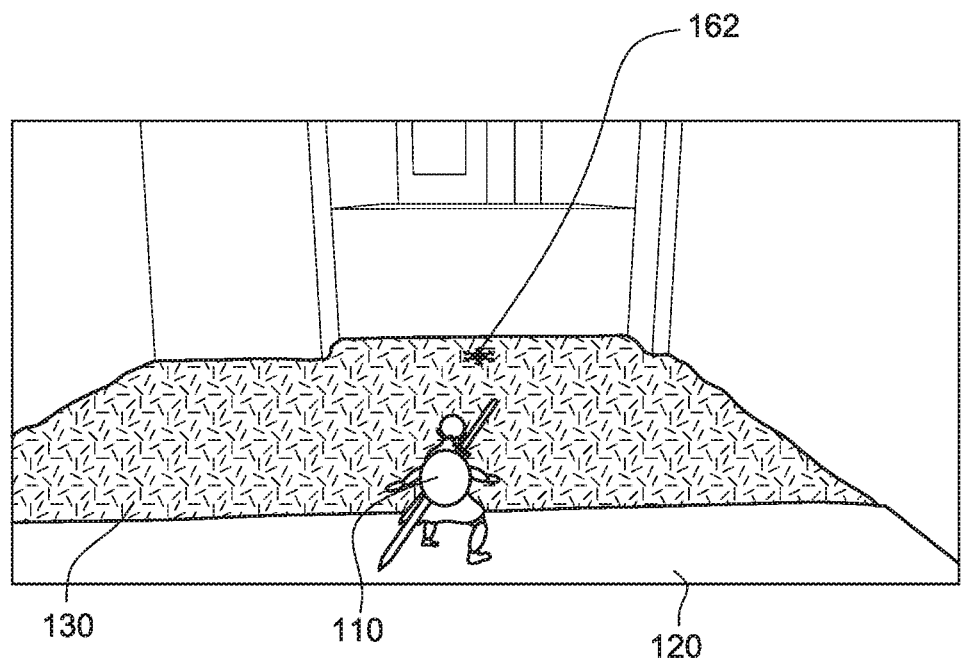

The marker 160 is displayed at the center of the image until the marker 160 coincides with a surface in the virtual space from which an ice pillar could be generated, at which point the marker 162 is displayed in the virtual space. FIG. 3 shows a marker 162 displayed at a location of the intersection of the imaging axis of the virtual camera and another surface in the virtual space (the water surface 130). The marker 162 may be visually different (e.g., different size, shape, color, etc.) from the marker 160 shown in FIG. 2 because the marker 162 is displayed on a water surface from which an ice pillar 180 could be generated. In one example embodiment, the marker 160 indicating an object in the virtual space will change to the marker 162 when the object is a movable object and a water surface from which an ice pillar 180 can be generated is located below the movable object.

Figure 4:
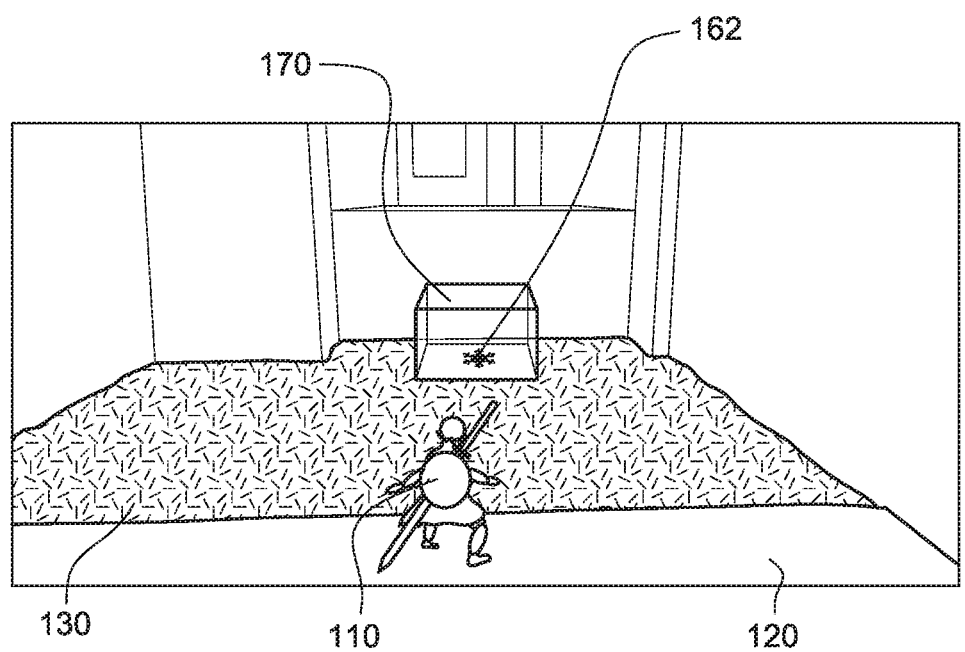
Figure 5:
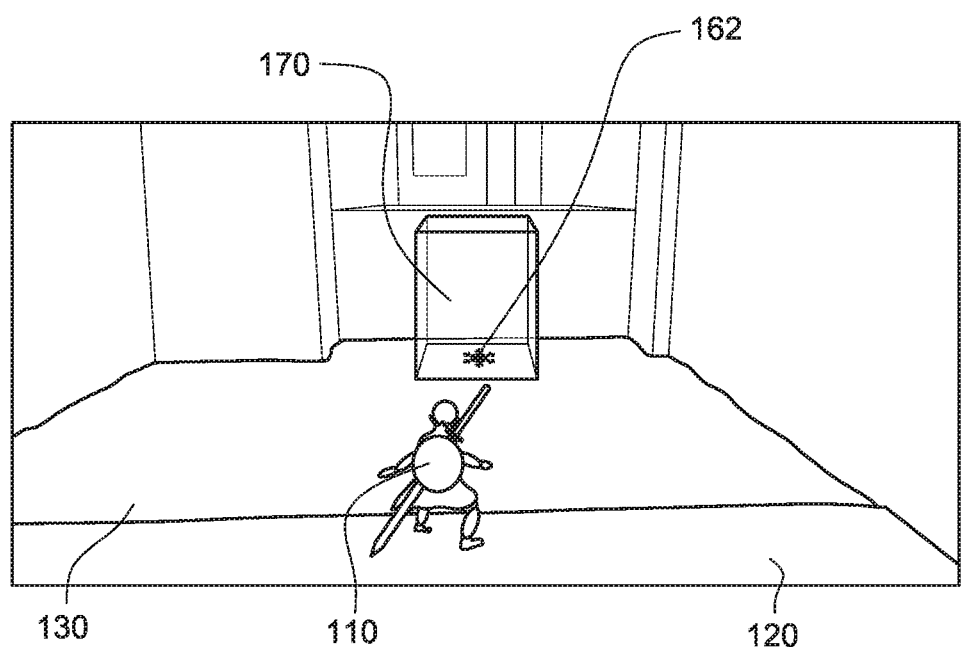

FIGS. 4 and 5 show an example indicator 170 extending from the water surface 130. Different portions of the indicator 170 may be displayed based on satisfaction of one or more conditions. For example, the indicator 170 may include a square or rectangle near the water surface 130 and may extend from the bottom to provide a pillar. The indicator 170 may be displayed as a square when the game processing determines that the imaging axis of the virtual camera intersects a surface (e.g., the water surface 130) from which it may be possible to generate an object (e.g., the ice pillar 180). The marker 162 may be displayed along with the indicator 170. The indicator 170 may be displayed as the pillar (e.g., progressively extending from the square or the water surface 130) when the game processing determines that an ice pillar 180 can be generated at the location of the marker 162. In one example embodiment, the user may change the position of the marker 162 by moving the marker 162 over the surface of the water.

In an illustrative embodiment, the indicator 170 is displayed progressively extending from the square or the water surface 130 to a predetermined height repeatedly, in a base direction, when the game processing determines that an ice pillar 180 can be generated at the location of the marker 162 or indicator 170. The indicator 170 is shown having a shape that corresponds to the shape of the ice pillar 180 to be generated and with transparent surfaces. In some example embodiments, the indicator 170 may not be transparent (e.g., may have one or more solid surfaces).

The position and/or orientation of the indicator 170 may change in response to changes in the position and/or orientation of the virtual camera. Thus, the user may "fine tune" the position of the ice pillar 180 that will be generated by making changes to the position of the indicator 170 and/or the marker 162. In one embodiment, displaying the indicator 170 progressively extending may end, while still displaying the indicator 170 as the square, if the position of the indicator 170 on the water surface 130 changes to another position on the water surface 130 at which the object (in this case, the ice pillar) cannot be generated (e.g., due to a collision of the ice pillar with another non-movable object in the virtual space). In one embodiment, display of the indicator 170 may end if the position of the marker 162 is moved to another surface from which the object cannot be formed.

Figure 6:
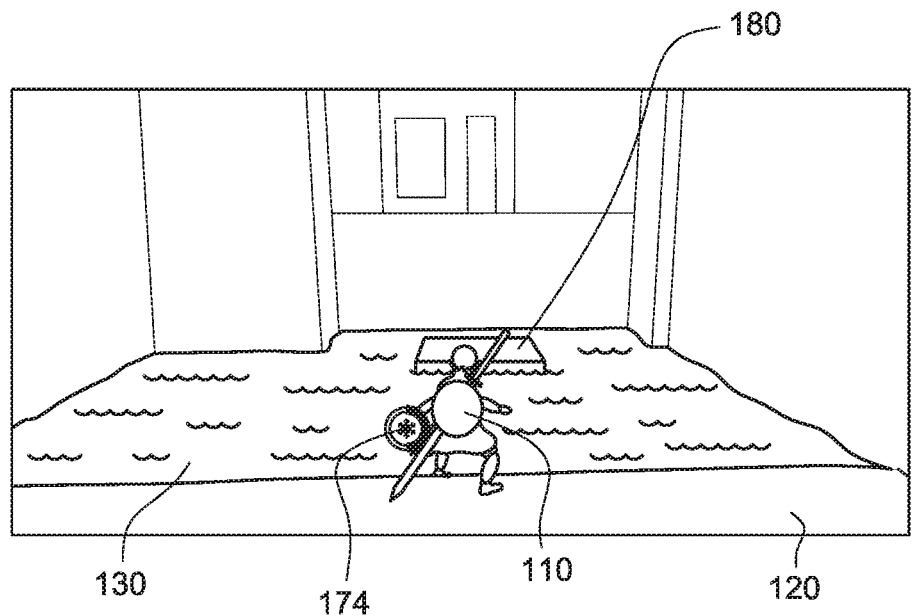
Figure 7:
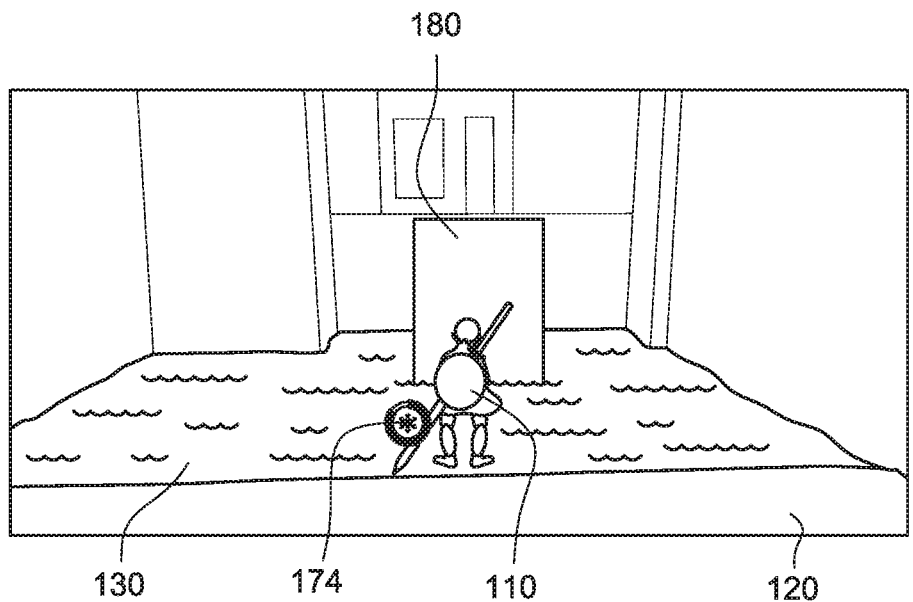

FIGS. 6 and 7 show ice pillar 180 being progressively generated in the virtual space from the water surface 130. The ice pillar 180 is generated when a specific condition is satisfied (e.g., user input is made while in the object generating mode). A gauge 174 may be displayed representing a time until the next ice pillar 180 can be generated. As illustrated in FIGS. 5 and 6, the water surface 130 from which the object is generated is displayed in a different manner (e.g., with a different color, brightness, and/or surface texture) from the time of entering an object generating mode and until the instructions are received to start generating the object. For example, the manner in which the water surface 130 is displayed while the ice pillar 180 is generated may correspond to the manner in which the water surface 130 was displayed before the object generating mode was entered. In some embodiments, the water surface 130 may be displayed in a different manner while the indicator 170 is not displayed on the water surface 130.

The ice pillar 180 may be generated such that the ice pillar 180 starts being generated below the water surface 130 (e.g., from the ground surface below the surface of the water) and extend through the water surface 130 and in a direction that is away from the water surface 130 into the air (away from bottom of the water). The direction in which the ice pillar 180 is generated may by perpendicular to the water surface, but is not so limited. The ice pillar 180 may be progressively generated until the ice pillar 180 reaches a specific height.

Figure 8:
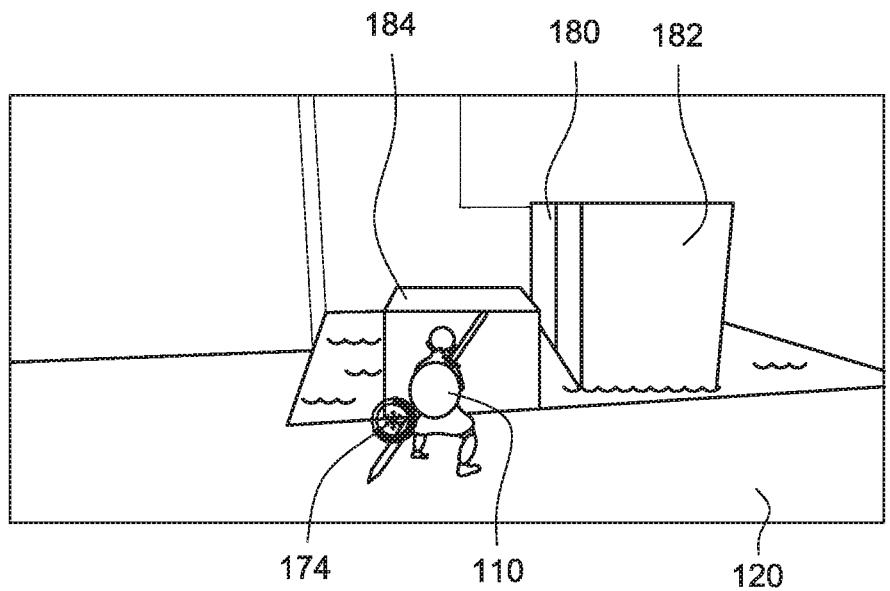

FIG. 8 shows a plurality of ice pillars 180, 182, and 184 generated in a virtual world from the water surface 130. The ice pillars 180, 182, and 184 may be sequentially generated in response to user inputs. FIG. 8 shows ice pillar 184 being generated after ice pillars 180 and 182. The ice pillars 180, 182, and 184 may be generated such that they are spaced from each other or provided directly adjacent to each other. The game processing may provide an object generating limit to that only up to a certain number of user-generated objects may be present in the game world at the same time. The game may provide for one object generating limit for the game world as a whole and one or more other object generating limits for particular sections of the game world. For example, when an object generating limit is reached, the input of an instruction to generate a subsequent ice pillar may result in removal of the first generated ice pillar (e.g., ice pillar 180) from the virtual game world. Of course, the game may allow a user to select which prior object should be removed and the game may also be configured so that no object generating limits are present.

The game may also provide for personalization of a generated object. For example, a user-generated object may include text or graphics identifying the user or game character that created the object or may provide a message for subsequent characters that arrive in the same section of the game world.

The player character 110 may be controlled to climb side surfaces of the ice pillars 180, 182, and 184, and/or move across the top surfaces of the ice pillars 180, 182, and 184. The user may control the generating of the ice pillars 180, 182, and 184 at specific location(s) to allow the player character 110 to move from one area of the virtual world to another area of the virtual world. The user may additionally or alternatively generate the ice pillars 180, 182, and 184 at specific locations to provide obstacles for other player characters or enemy characters.

Figure 9:
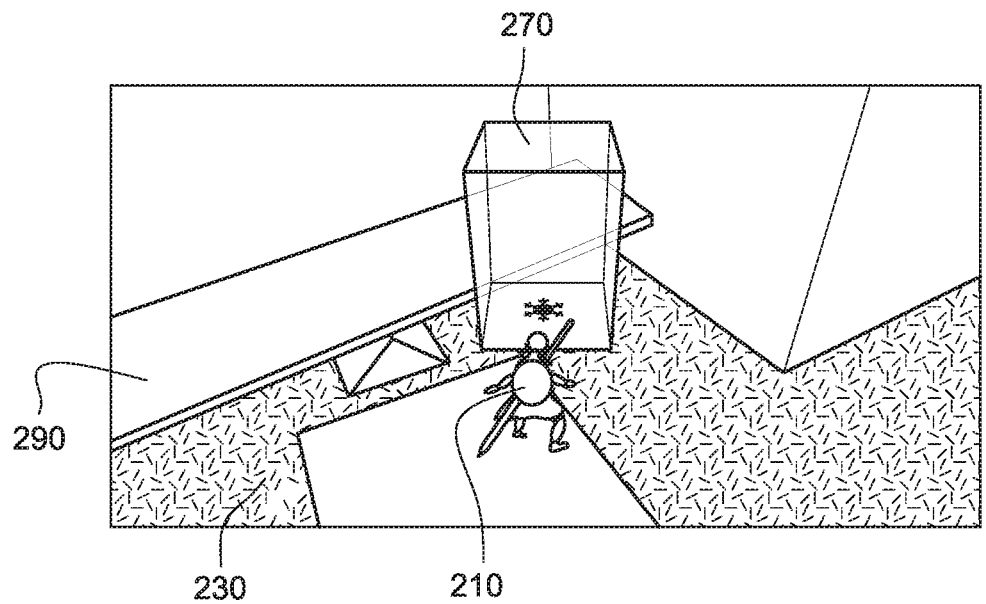
Figure 10:
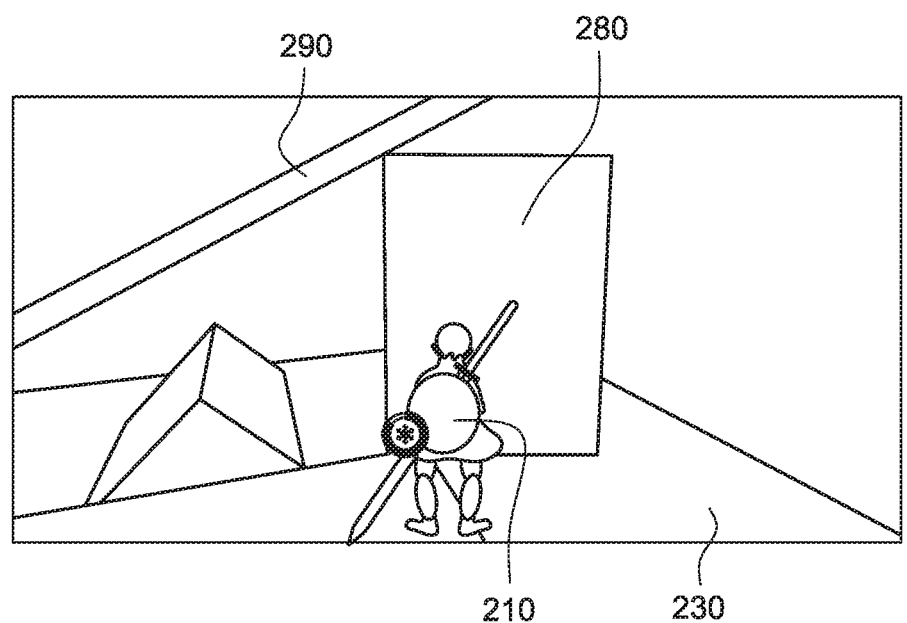

FIGS. 9 and 10 show generating an ice pillar 280 in the virtual world such that the ice pillar 280 moves another object 290 in the virtual space. In this way, a user may generate combinations of one or more objects to move and/or support another object in the virtual space. Moving and/or supporting other objects in the virtual space by generating the object may provide a game character with an additional paths for movement, provide shelter, uncover items hidden by the other object, remove obstacles for the player character, or create obstacles for other characters in the virtual space. In some example embodiments, generating the object may move the player character or another character (e.g., enemy character) if the object is generated at the position of the player character or the other character. As shown in FIG. 9, an indicator 270 is displayed extending from a water surface 230 under another object 290. The indicator 270 shows the position, orientation, size of the object that will be generated, and direction of movement of the growing ice pillar 280 as it will be generated. In addition, the indicator 270 is illustrated with a transparent surface to show at what position the generated ice pillar 280 will interact with the other object 290 when the ice pillar 280 is generated.

FIG. 10 shows the ice pillar 280 being progressively generated from the water surface 230 until the ice pillar 280 reaches a specific height. When the ice pillar 280 being generated reaches the other object 290, the ice pillar 280 makes contact with the other object 290 and causes the other object 290 move from its original location. The other object 290 may be moved in an upward direction (e.g., direction in which the ice pillar 280 is being generated) and/or to the side of the ice pillar 380.

The other object 290 is moved in response to generating the ice pillar 280 because the other object 290 is a movable object in the virtual world. If the other object 290 is a non-movable object (e.g., object that is not movable by the ice pillar 280), placing the indicator under the other object 290 may display the indicator 270, but without progressively extending from the square, to let the user know that the ice pillar 380 cannot be generated at this location.

In an example embodiment, if the ice pillar 380 makes contact with a non-movable object after generating the ice pillar 380 is started (e.g., the indicator 270 did not collide with the non-movable object at the time generating the ice pillar 380 is started but the non-movable object is moved and collides with the ice pillar 380 after the generating is started), the ice pillar 380 is destroyed (e.g., when the ice pillar 380 makes contact with the non-movable object). In this example, the non-movable object may be an object that is not movable by the ice pillar 380 being generated but is moved by the game (e.g., a moving ceiling or a moving floor). The non-movable object may be an object that is not movable in one direction (e.g., direction in which the ice pillar 380 is generated) but is movable in one or more other directions based on instructions in the game.

Figure 11:
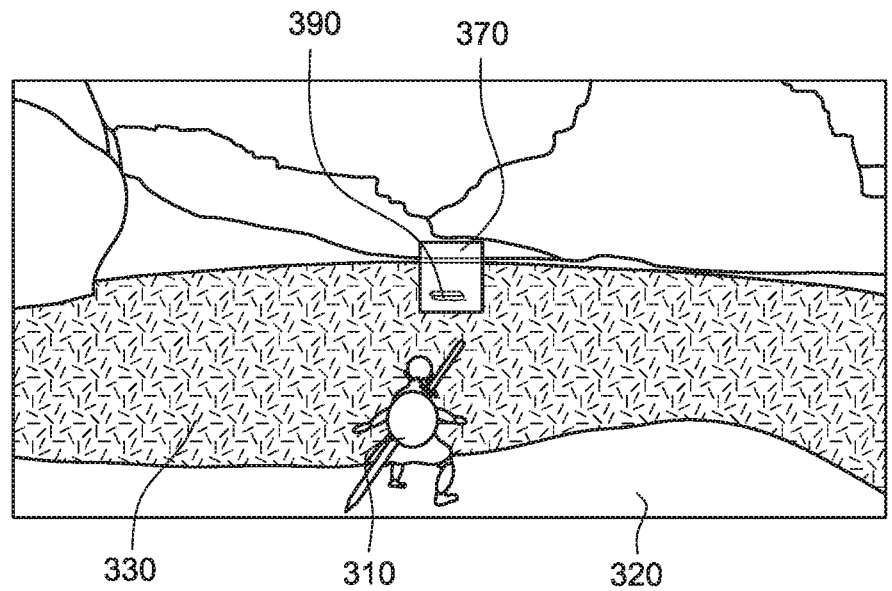
Figure 12:
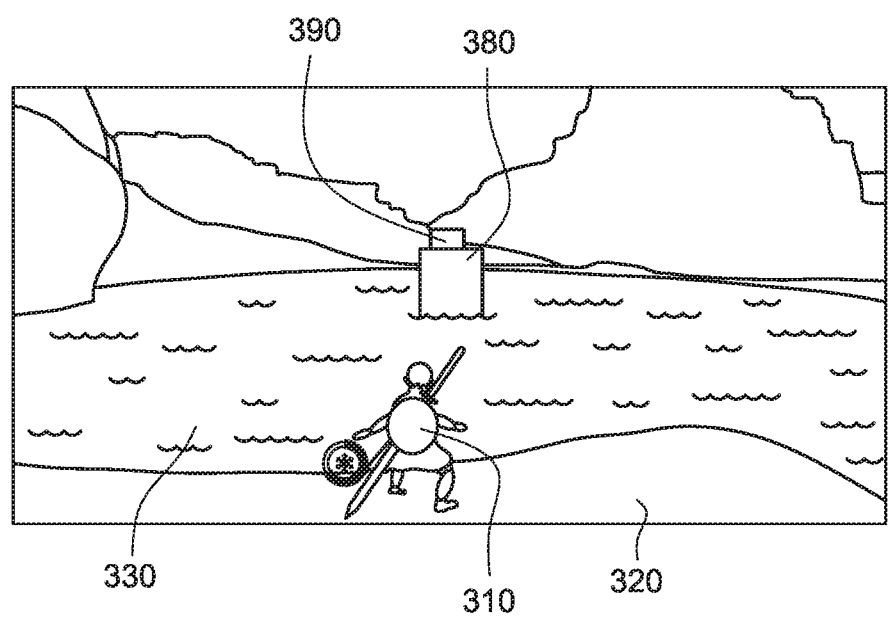

FIGS. 11 and 12 show an example embodiment in which an ice pillar 380 is generated in the virtual world such that the generated ice pillar 380 moves another object 390 in the virtual space. As shown in FIG. 11, the other object 390 may be provided on the water surface 330. A portion of the other object 390 may be partially submerged below the surface 330.

In the virtual space, the player character 310 may not be able to safely move across or through the water surface 330 to the object 390 which may, for example, be a weapon, a coin, and the like. To move from the ground surface 320 to the location of the other object 390, the user may generate a plurality of ice blocks or pillars from the water surface 330. As illustrated in FIG. 12, a user may generate one ice pillar 380 to lift the other object above the water surface 330 to facilitate obtaining of the object 390 by the player character.

FIG. 11 shows an indicator 370 displayed at the water surface 330. A user may control the positioning of the indicator 370 such that the indicator 370 is displayed at the location of the other object 390. Once the indicator 370 is displayed at the location of the other object 390, instructions may be received to generate the object based on a specified user input.

FIG. 12 shows the ice pillar 380 being generated in the virtual space from the water surface 330. The ice pillar 380 is generated in response to a specific condition being satisfied (e.g., a user input is made while in the object generating mode). The ice pillar 380 may be generated such that the ice pillar 380 starts being generated below the water surface 380 (e.g., from a predetermined distance below the surface of the water) and extends in the direction away from the water surface 330 (e.g., direction that is perpendicular to the water surface). The ice pillar 380 may be progressively generated until the ice pillar 380 reaches a specific height set for the ice pillar 380.

As the ice pillar 380 is generated, the other object 390 may be moved in an upward direction when the generated ice pillar 380 contacts with the other object 390. The other object 390 may remain on a top planar surface of the ice pillar 380 until the generated ice pillar 380 is removed from the virtual world.

Figure 13:
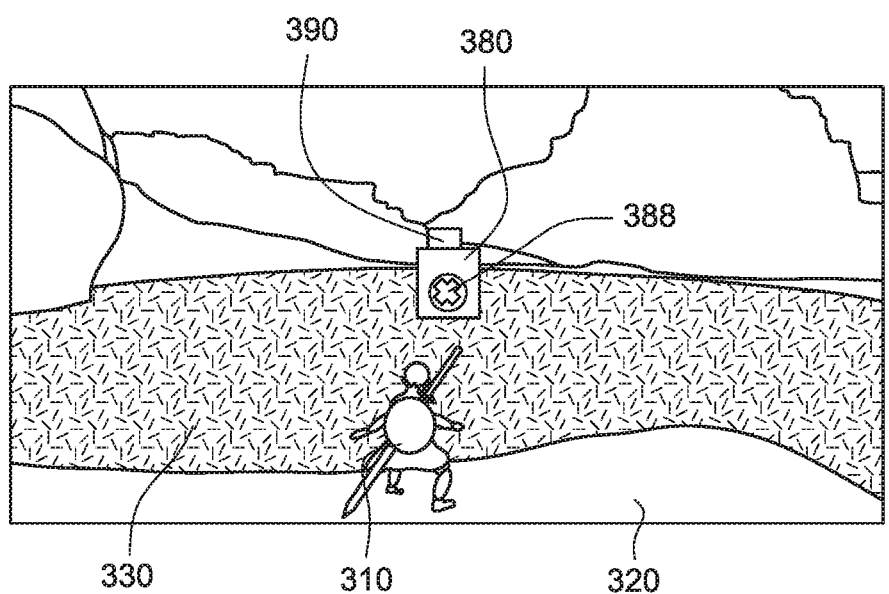

Previously generated ice pillars may be removed from the virtual world in response to specific user commands. In one example, previously generated ice pillars may be removed from the virtual world by controlling the imaging axis of the virtual camera to intersect with the previously generated ice pillar and receiving a user input to remove the previously generated ice pillar. FIG. 13 illustrates an imaging axis of the virtual camera intersecting a generated ice pillar 380. When the virtual camera is moved such that the imaging axis intersects with the previously generated ice pillar 380, a marker 388 is displayed on or near a surface of the generated ice pillar 380 and/or a color, brightness and/or texture of the generated ice pillar 380 is changed. The marker 388 indicates that the ice pillar can be removed (e.g., shattered) if a specific input is received. Receiving the specific input after this marker 388 is displayed on the ice pillar 380 or after changing the manner in which the ice pillar 380 is displayed, will remove the previously generated ice pillar 380. In response to removing the ice pillar 380, the other object 390 may fall back to the water surface 330. Here again, marker 388 is not limited to being associated with the imaging axis of the virtual camera and may be invoked and moved based on user inputs to a remote control device.

While FIGS. 1-13 are discussed with reference to generating an ice pillar from a water surface, this disclosure are not so limited and may include other objects being generated from other surfaces. For example, a sand pillar may be generated from a sand surface or a cloud pillar may be generated form a cloud surface.

FIG. 14 illustrates an example screen of an information processing device 1400 displaying an image of a virtual space. The information processing device 1400 may execute an application program (e.g., a game application) and control a player character 1410 in a virtual space based on instructions in the application program and/or inputs (e.g., inputs to remote control device(s) 1450 supplied by one or more users). Additional details about remote control devices 1450 are provided in U.S. application Ser. No. 15/179,022, which corresponds to U.S. Patent Publication No. 2016/0361641. The contents of the '022 application are incorporated herein in their entirety.

As shown in FIG. 14, an image of a virtual space, as seen from a virtual camera, is displayed on the screen of the information processing device 1410. A virtual camera (not shown in FIG. 14) may be set at a position in the virtual space above and/or behind the player character 1410 to provide a view of the virtual space in a direction forward of the player character 1410. The position of the virtual camera may be determined in accordance with the position of the player character 1410, which may be controlled based on user inputs. The orientation of the virtual camera in the virtual space may change based on changes in the orientation of the player character 1410 made based on instructions in the application program and/or inputs (e.g., inputs to remote control device(s) 1450 supplied by one or more users). In some embodiments, the orientation and/or position of the virtual camera may be changed based on other conditions (e.g., specific user controls, progress of a game, and/or interaction of the player character 1410 with other objects in the virtual space). For example, control may be provided to allow the user to move the virtual camera independently from the movement of the player character 1410 (e.g., allow the player character 1410 to look around the virtual space or at least a part of the virtual space from a current location of the player character in the virtual space).

Based on changes in the orientation and/or position of the virtual camera, the image of the virtual space displayed on the screen will change. In some example embodiments, the image of the virtual space may be displayed with the viewpoint of the player character 1410 (e.g., the position of the virtual camera may be set at the first person view of a player character).

The user of the information processing device 1400 may need to achieve certain goals in the virtual space. For example, a user may need to move the player character 1410 from one area of the virtual space to another area of the virtual space or may need move specific objects in the virtual space. The user may achieve these tasks by generating objects in accordance with the technology described in this application. For example, objects may be generated on a specific surface (e.g., horizontal surface, vertical surface, or slanted surface in the virtual space) to allow the player character 1410 to use the objects to move from one side of the surface to another side of the surface, where the player character 1410 cannot otherwise move across the surface. In another example, objects may be generated in a growing manner from a base point in the virtual space (e.g., a growing ice ball is generated from a base point). In another example, a specific object may be moved in the virtual space by generating an object such that the generated object will contact the specific objects to be moved. In other example embodiments, objects may be generated in the virtual space to create obstacles (e.g., for enemy characters in the virtual space).

Figure 15A:
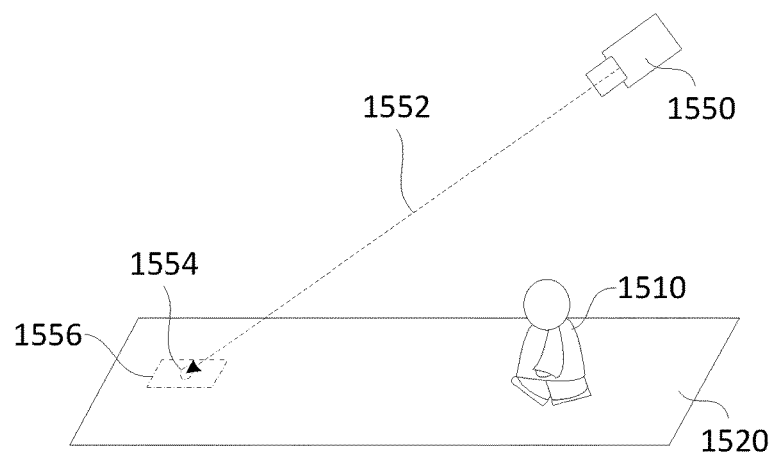
FIGS. 15A-15C show non-limiting examples of a process for generating an object in a virtual space.
Figure 15B:
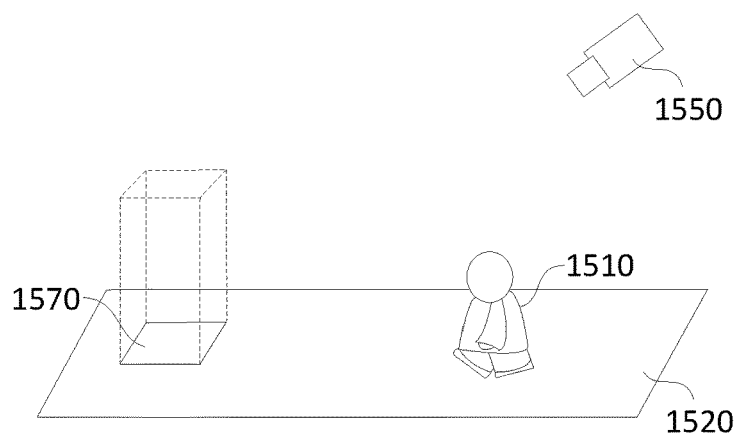
Figure 15C:
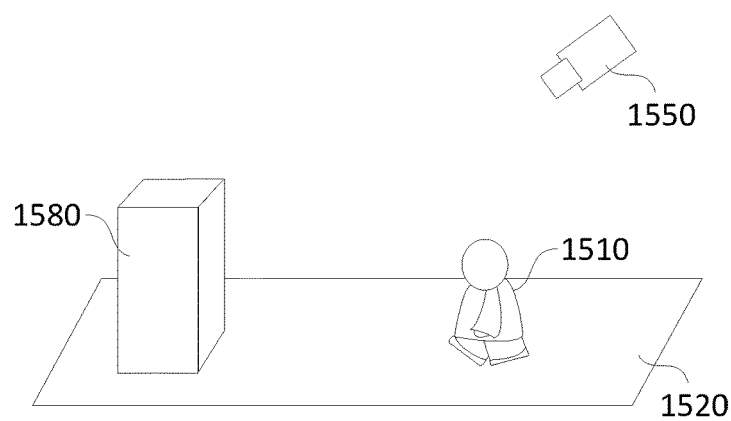

FIGS. 15A-15C illustrate an example process for generating an object 1580 in a virtual space. The process may, for example, be implemented by instructions contained in a game application program which is stored in a non-volatile memory and executed by a processor. FIG. 15A shows a player character 1510 movable in accordance with user inputs on a surface 1520 in a virtual space. Virtual camera 1550 captures images of the virtual space. The location for generating an object in the virtual space may be determined based on position and/or orientation of the virtual camera. For example, the location for generating the object in the virtual space may be determined based on an imaging axis 1552 of the virtual camera 1550. Based on the imaging axis 1552 of the virtual camera 1550, a base for the object 1580 may be determined. In particular, as discussed above, the position of the base can be moved by changing a direction and/or orientation of the virtual camera 1550. The base for the object may be a base point or a base plane. As shown in FIG. 15A, the base for the object 1580 may be a base point 1554 or a base plane 1556 corresponding to a point (or a planar area around such point) where the imaging axis 1552 intersects the surface 1520. The position of the base may of course be determined in ways not involving the imaging axis of the virtual camera.

The surface 1520 may include a plurality of different types of surfaces. For example, the surface 1520 may include a ground surface in the virtual world and a liquid (e.g., water) surface in the virtual world. While the surface 1520 is illustrated in FIGS. 15A-15C as being provided on a same plane, the various types of surfaces may be provided on different planes and/or each different type of surface may have a planar or varying profile.

With the base of the object 1580 to be generated in the virtual space determined, the process may determine a base direction. The base direction may provide the direction relative to the base in which the object 1580 will be generated in the virtual space. The base direction may be determined based on the direction of the surface 1520 at the location of the base. The base direction may be an upward direction from the surface 1520 (e.g., into the air of the virtual space) or a downward direction from the surface 1520 (e.g., gravity direction). The base direction may, for example, be a direction that is perpendicular to the surface 1520, but is not so limited.

An indicator 1570 is displayed at the base. The indicator may be a visual display element for providing one or more characteristics of the object to be generated, how the object will be added to the virtual space, and/or how the object will interact with other objects in the virtual space. The indicator 1570 may be displayed based on determining that the type of surface in the virtual space on which the indicator 1570 will be displayed is a type of surface from which an object could be generated. In FIG. 15B, the indicator 1570 is displayed with a two-dimensional shape (e.g., a square) and a three-dimensional shape (e.g., a pillar) corresponding to the shape of the object 1580 to be generated. The indicator 1570 may be displayed as a static indicator or a dynamic indicator providing an animation. In an example embodiment, different portions of the indicator 1570 and/or the indicator 1570 may be displayed in a different manner (e.g., statically or dynamically) based on satisfying one or more conditions (e.g., determining that the object could be generated from the surface and/or determining that the object can be generated from the base and/or in the base direction).

In an example embodiment, based on the determined base and/or base direction, a static indicator 1570 (e.g., a square) is displayed when the surface is a surface from which the object could be generated. The indicator 1570 may be displayed dynamically (e.g., a pillar progressively extending in an upward direction from the square) after the determination is made that the object 1580 can be generated at the base and/or in the base direction. Such a determination may include determining whether the type of surface in the virtual space is a type of surface from which an object can be generated, whether specific conditions at the base on the surface (e.g., distance to another surface below surface) are satisfied, and/or how the object to be generated will interact with other objects in the virtual space when the object is generated.

The indicator 1570 may be animated such that the indicator 1570 repeatedly grows from the base until it reaches a specific height. The animation of the indicator may provide a direction in which the object will expand when it is generated. The height of the indicator 1570 may correspond to the height of the object to be generated. In this way, the indicator 1570 may allow the user to better ascertain various characteristics of the object to be generated (e.g., its size, dimensions, and/or location in the virtual space, etc.).

The indicator 1570 is not limited to examples discussed above and may include other 2-dimensional or 3-dimensional objects. For example, the indicator 1570 may include an object having a shape that corresponds to the object to be generated, a circle or sphere that expands from the base point in the base direction, a rectangle, a cube, a cylinder, rectangular prism, a cone, a pyramid, or a triangular prism. In an example embodiment, the indicator 1570 may be depicted as an arrow provided at the location of the base and pointing in the determined base direction. The arrow may be a static arrow depicting a direction in which the object will be generated (e.g., a base direction) and/or the height of the object after it is generated. In another example, the arrow may be a dynamic arrow depicting a direction in which the object will be generated by progressively extending from the base in the base direction and/or depicting the height of the object to be generated by extending to a height that corresponds to the height of the object to be generated.

The user may supply inputs to a remote control in order to change the position of the indicator 1570.

FIG. 15C illustrates the generated object 1580 in the virtual space. The object 1580 may be generated, for example, after the user positions the indicator 1570 at a particular location and when a specific condition is satisfied. For example, the specific condition may be a specific user input. The object 1580 may be progressively generated from the base in the base direction. For example, the object may appear from the base at the surface 1520 and progressively extend in the base direction until the object 1580 reaches a specific height set for the object 1580.

After the object 1580 is generated, subsequent objects may be generated with the same process at other locations in the virtual space. The object 1580 may remain in the virtual space until a specific condition is satisfied. After the specific condition is satisfied, the generated object may be removed from the virtual space. The specific condition may, for example, be a predetermined amount of time, user instructions to remove the generated object, a subsequent object is generated after a user-generated object limit for the generating object is reached. By way of illustration, if three user-generated objects are present in a virtual space in which the user-generated objet limit is three, upon receiving instructions to generate a fourth object, one of the three objects previously generated may be removed from the virtual space. In one example, the object that was first generated (earliest generated) out of the three objects may be automatically removed upon receiving instructions to generate the fourth object.

Figure 16A:
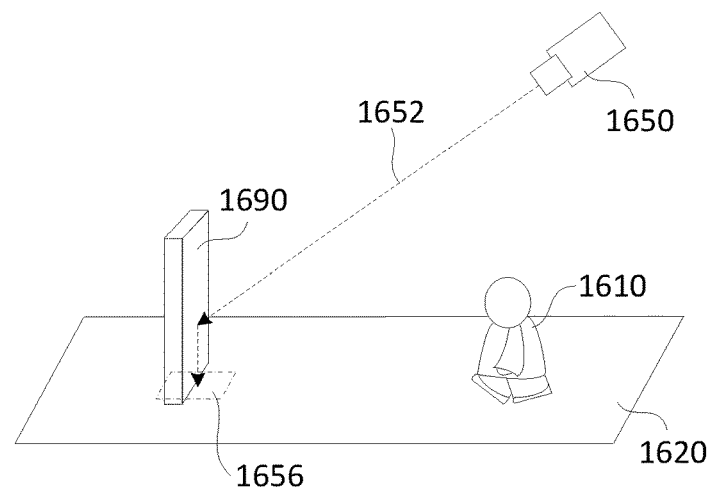
FIGS. 16A-16C show non-limiting examples of a process for generating an object in a virtual space.
Figure 16B:
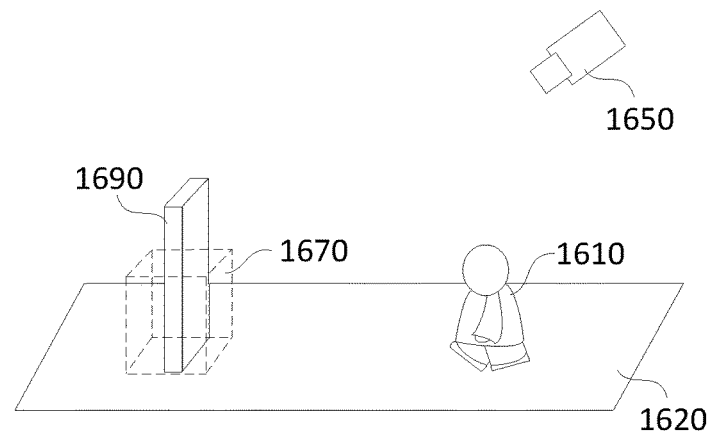
Figure 16C:
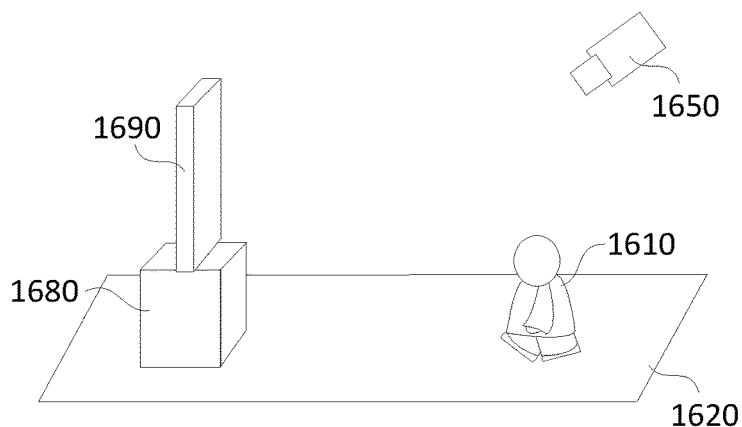

FIGS. 16A-16C illustrate another example process of generating an object 1680 in a virtual space. FIG. 16A shows a player character 1610 positioned on a surface 1620 in a virtual space. A virtual camera 1650 is provided in the virtual space and captures images of the virtual space. The position for generating the object 1680 in the virtual space may be determined based on an imaging axis 1652 of the virtual camera 1650. Based on the imaging axis 1652 of the virtual camera 1650, a base 1656 for the object 1680 may be determined.

As shown in FIG. 16A, another object 1690 may be included in the virtual space. If the imaging axis 1652 of the virtual camera 1650 intersects with the other object 1690 at a first point, the base 1656 for the object 1680 may be determined by locating a second point relative to the first point, e.g., by generating a line from the first point in the downward direction (e.g., direction towards the surface). The base may correspond to a point on the surface 1620 intersected by the generated line.

With the base of the object 1680 to be generated in the virtual space determined, the process determines a base direction. The base direction may correspond to a direction in which the object 1680 will be generated in the virtual space relative to the base 1656. The base direction may be determined based on the direction of the surface 1620 at the location of the base 1656. For example, the base direction may be a direction that is perpendicular to the surface 1620.

Based on the determined base and/or base direction, the process determines whether an object 1680 can be generated at the base and/or in the base direction. Such a determination may include, for example, determining whether the surface is a type of surface from which the object can be generated, whether specific conditions at the base on the surface (e.g., distance to another surface below surface) are satisfied, and/or how the object to be generated will interact with other objects in the virtual space when the object is generated.

As shown in FIGS. 16A-16C, generating the object 1680 in the virtual space will cause the object 1680 to make contact with the other object 1690. Determining whether the object 1680 can be generated at the base 1656 and/or in the base direction may include determining whether the other object 1690 is a movable object in the virtual space. If the other object 1690 is a movable object and is movable in the base direction, the process determines that the object 1680 can be generated at the base and in the base direction. However, if the other object 1690 is a stationary object or not movable in the base direction, the process may determine that the object 1680 cannot be generated at the base and in the base direction. Determining whether the object 1680 can be generated at the base and/or in the base direction may further include determining whether the other object 1690 is movable in the base direction for a distance that corresponds to the height of the object 1680. If the other object 1690 is movable but will prevent the object 1680 being generated to the height of the object 1680, the process may determine that the object 1680 cannot be generated in the base direction at the base.

Based on determining that the object 1680 can be generated from the base and/or in the base direction, an indicator 1670 may be displayed at the base 1656. As shown in FIG. 16B, the indicator 1670 may be provided at the location of the base and extend in the determined base direction. The indicator 1670 may have a shape that corresponds to the shape of object 1680.

The indicator 1670 may be animated such that the indicator 1670 repeatedly extends from the surface 1620 or base until it reaches a specific height. The animation may continue until instructions to generate the object 1680 are received or an object generation mode is terminated. The height of the indicator 1670 may correspond to the height of the object 1680 to be generated. The indicator 1670 may allow the user to better ascertain various characteristics of the object to be generated (e.g., its size, dimensions, and/or location in the virtual space, etc.), without having to generate the object 1680. In this way, if the location of the indicator 1670 and/or the interaction of the object 1680 with other objects in the virtual space is not desired, a user may want to change the location of where the object 1680 will be generated before the object 1680 is generated (e.g., by moving indicator 1670 in accordance with user inputs). As shown in FIG. 16B, the indicator 1670 having transparent surfaces is displayed in the virtual space.

FIG. 16C illustrates the generated object 1680 in the virtual space. The object 1680 may be generated, for example, after the user positions the indicator 1670 at a particular location and when a specific condition is satisfied. For example, the specific condition may be a specific user input. The object 1680 may be progressively generated from the base in the base direction. For example, the object may appear from the base 1656 at the surface 1620 and progressively grow in the base direction until the object 1680 reaches a specific height.

Generating the object 1680 in the virtual space may cause the object 1680 to make contact with one or more other objects in the virtual space. As shown in FIG. 16C, generating the object 1680 from the base in the base direction will cause object 1680 to make contact with the other object 1690. Because the other object 1690 is a movable object in the virtual space, generating the object 1680 will cause the other object 1690 to move in the virtual space (e.g., in the base direction).

If there is a space between the surface 1620 and the other object 1690, movement of the other object 1690 will occur when the generated object 1680 reaches and contacts the other object 1690.

Being able to move other objects by generating an object in the virtual space from a surface, may allow a user to lift objects that the player character 1610 may not be otherwise able to lift. For example, the player character 1610 may generate an object at a location of a gate to lift the gate to allow the player character to pass under the gate. In other embodiments, moving another object by generating an object may provide a path for the player character to move across. In some embodiment, generating an object may move another object (e.g., a sphere or a block) to a side of the generated object.

Figure 17:
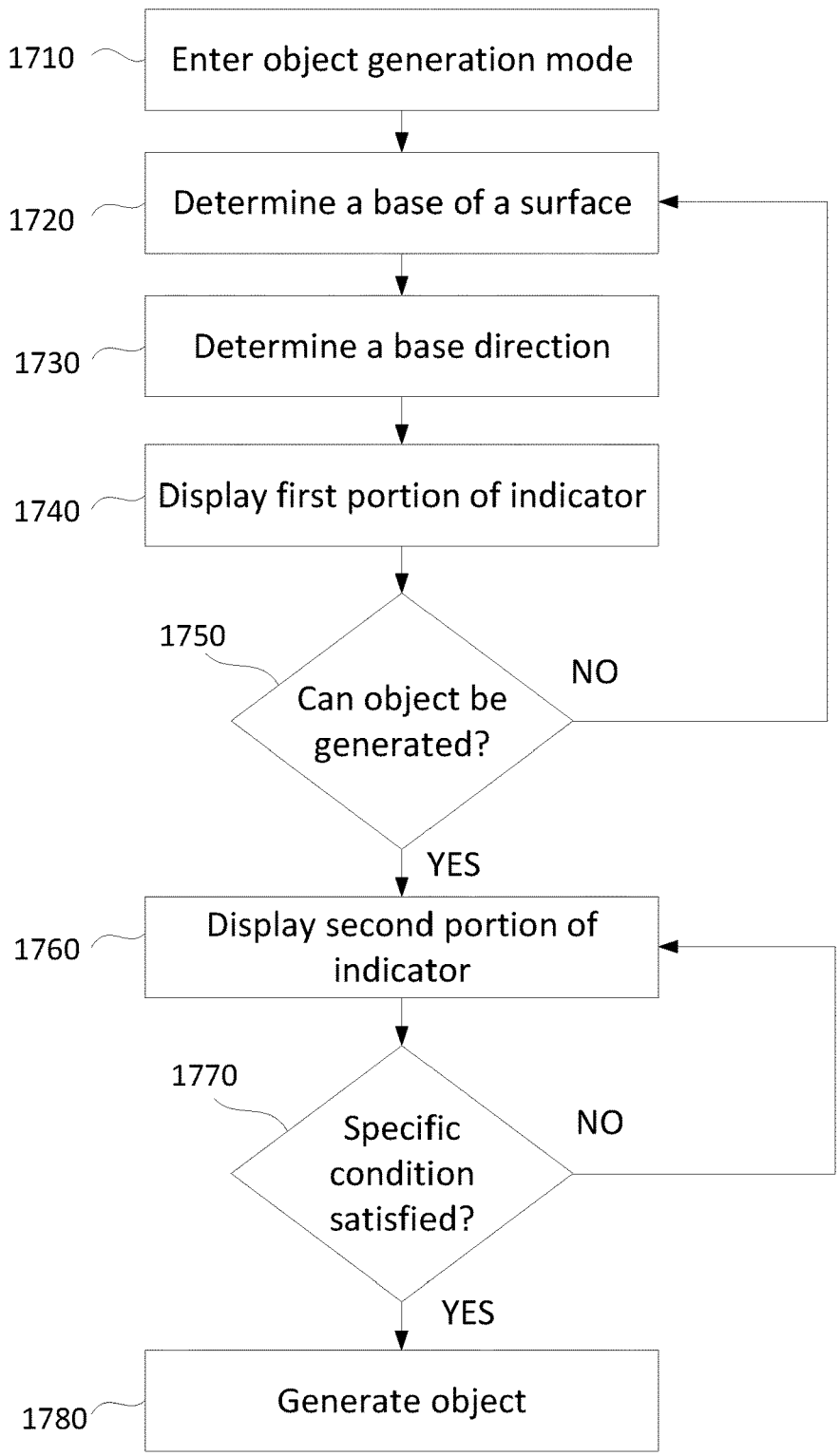
FIG. 17 is a flow chart illustrating a non-limiting example method for generating an object in a virtual space.

An example process for generating an object in a virtual space will now be described with reference to FIG. 17. One or more steps of the process may be performed by computer system including one or more processors and one or more software modules including program instructions. At Step 1710, a processing system of an information processing device, may enter an object generating mode. The object generating mode may be entered in response to a specific condition being satisfied (e.g., specific user input). For example, the processing system may activate the object generating mode in response to receiving a specific user input from a controller during execution of a game application program. Upon entering the object generating mode, the processing system may change a surface in the virtual space on which the object can be generated by displaying the surface in a manner different the manner in which the surface is displayed in a mode other than the object generating mode. For example, when the object generating mode is entered, a surface, on which the object can be generated, may be displayed with a different color, different brightness, and/or additional features (e.g., guidelines or a grid).

At Step 1720, a base of a surface may be determined. The base may be determined for a surface in the virtual space based on an imaging direction of a virtual camera in the virtual space. For example, the base may be determined based on where an imaging axis of a virtual camera intersects a surface in a virtual space. For example, the processing system may receive coordinates of the virtual camera in the virtual space and based on the coordinates and the orientation of the virtual camera determine a point in the virtual space where the imaging axis of the virtual camera intersects the surface.

The base may be a base point, a base plane, or a base having a shape that corresponds to a cross section or bottom surface of the object to be generated in the virtual space. Determining the base may include determining an orientation of the base based on the angle of the surface in the virtual space, the imaging axis of the virtual camera and/or horizontal direction in the virtual space.

At Step 1730, a base direction may be determined. The base direction specifies the direction in which the object will be generated in the virtual space relative to the base. The base direction may be determined based on the direction of the surface at the location of the base. The base direction may be, for example, a direction that is perpendicular to the surface.

At Step 1740, a first portion of the indicator (e.g., a square) may be displayed at the base. The first portion of the indicator may be displayed when the base is at a location that corresponds to a surface near which an object could be generated. At Step 1740, the first portion of the indicator may be displayed as a static indicator.

At Step 1750, a determination is made as to whether the object can be generated. The determination may include determining whether the object can be generated at the base and/or in the base direction. Such a determination may include determining whether specific conditions at the base (e.g., distance to another surface below surface) are satisfied, and/or how the object to be generated will interact with other objects in the virtual space when the object is generated, but is not so limited. If the object cannot be generated at the base (NO in Step 1750), the process may repeat steps 1720, 1730, and 1740 until the location of the base is changed to a location where the object can be generated or the object generating mode is terminated (e.g., by changing the position and/or orientation of the virtual camera).

If the object can be generated at the base (YES in Step 1750), a second portion of the indicator may be displayed in Step 1760. The second portion of the indicator may be displayed so as to extend from the base in the base direction. The second portion of the indicator may be displayed as an extension of the first portion of the indicator already displayed. The second portion of the indicator may, for example, provide a preview of how the object will look in the virtual space, the location where the object will be generated, demonstrate how the object will be generated in the virtual space, and/or how the object will interact with other objects in the virtual space, without generating the object. The second portion of the indicator may be displayed repeatedly extending from near the first portion of the indicator in the base direction. In an example embodiment, the first portion of the indicator may be a primary indicator and a second portion of the indicator may be a secondary indicator, which is different from the primary indicator.

If a specific condition is satisfied after the indicator is displayed (YES in Step 1770), the object may be generated in Step 1780. The specific condition may be a specific user input. The object may be generated when the specific user input is received after the initial display of the indicator. The object may be progressively generated from the base in the base direction. The position and/or orientation for the object being generated may correspond to the position and/or the orientation of the base. If a specific condition is not satisfied after the indicator is displayed (NO in Step 1770), the display of the indicator may continue until the specific condition is satisfied (YES in Step 1770) (e.g., after the position and/or orientation of the camera is changed or until the object generating mode is terminated).

Figure 18:
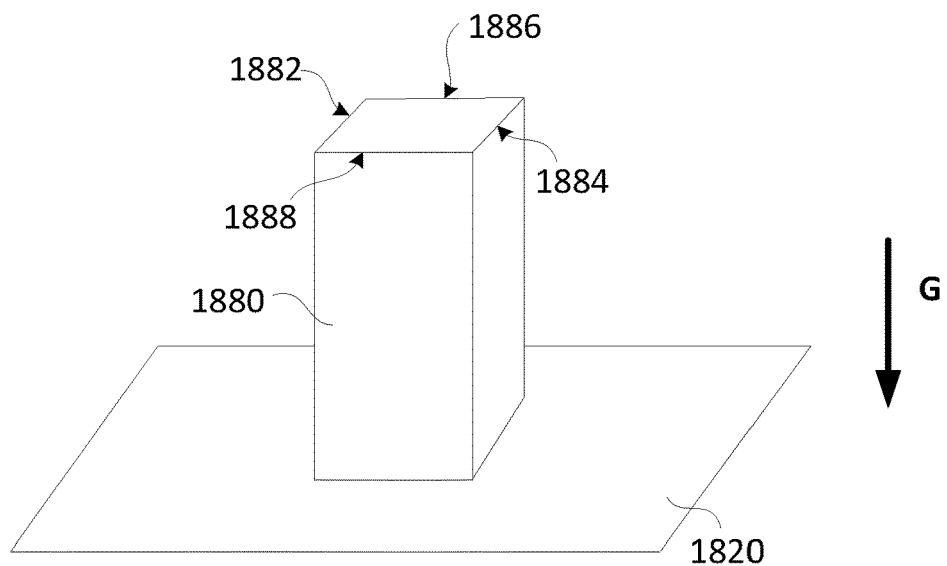
FIGS. 18 and 19 show non-limiting examples for how orientation of the base and/or object in the virtual space are determined.
Figure 19:
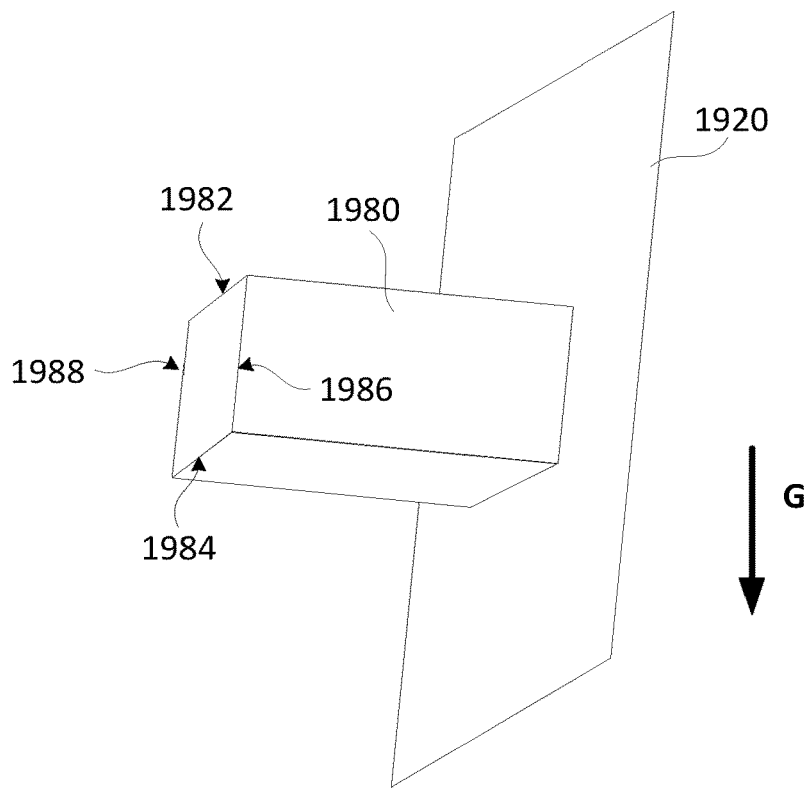

FIGS. 18 and 19 illustrate non-limiting examples of how orientation of the base and/or object in the virtual space are determined. Such determinations may be made when the base is determined (e.g., in Step 1720) and the orientation of the object may correspond to the orientation determined for the base. As discussed above, the base direction for the object may be a direction that is perpendicular to the surface from which the object is generated. If the object has a planar top surface, generating the object in the base direction will provide a top surface that is parallel to the surface from which the object is generated. As explained further below, the orientation of the base or object in the virtual space may be determined based on the imaging direction of the virtual camera, the angle of the surface in the virtual space, and/or horizontal direction in the virtual space.

FIG. 18 illustrates how the orientation of the object 1880 is determined when an angle of a surface 1820, from which the object is generated, is horizontal or does not exceed a specific limit relative to a horizontal direction in the virtual space. The horizontal direction may be a direction that is perpendicular to a gravity direction G in the virtual space. By way of example, and without limitation, the specific limit may be 18 degrees. When the angle of the surface does not exceed the specific limit, the orientation of the object 1880 may be set such that sides 1882 and 1884 of top surface of the object 1880 are parallel to a direction from the virtual camera. Sides 1886 and 1888 of top surface of the object 1880 may be set such that they are perpendicular to sides 1882 and 1884 and/or the gravity direction G. The direction from the virtual camera may correspond to a horizontal component of the imaging axis of the virtual camera.

FIG. 19 illustrates how the orientation of the object 1980 is determined when an angle of the surface 1920, from which the object is generated, equals or exceeds a specific limit relative to a horizontal direction in the virtual space. By way of example, and without limitation, the specific limit may be 18 degrees. When the angle of the surface equals or exceeds the specific limit, the orientation of the object 1980 may be set such that sides 1982 and 1984 of an end surface of the object 1980 are parallel to a horizontal direction in the virtual space. Sides 1986 and 1988 of top surface of the object 1980 may be set such that they are perpendicular to sides 1982 and 1984.

As illustrated in FIG. 19, if the object 1980 is generated from a surface that is parallel or approximately parallel to a gravity direction, a surface of the generated object 1980 that is perpendicular to the surface from which the object 1980 is generated may be used as a surface to step on by the player character or to hold another object.

Determining whether an object can be generated in the base direction and/or at the base may include determining whether the surface satisfies one or more predetermined conditions. For example, a condition may be that the surface is a water surface or a sand surface in the virtual space.

In other embodiments, determining whether an object can be generated in the base direction and/or at the base may include determining whether the surface satisfies one or more predetermined conditions at the location of the base. For example, one condition may include that the surface is a specific type of surface (e.g., a water surface) and a second condition may include that the depth of the water surface exceeds a specific value (e.g., 0.25 m in the virtual space). For example, if the depth of the water at the location of the base does not exceed the specific value, the determination may be made that the object cannot be generated at the location of the base. In one example embodiment, the whole surface at the base needs to satisfy this condition. Thus, a portion of the base cannot be located on another type of surface (e.g., a ground surface in the virtual space) for this embodiment.

As discussed above, the height of the indicator and/or the object may be set to a specific height. For example, the height may be set to 4.0 m in the virtual space. In other embodiments, the height of the object may be set based on the height of the indicator when a specific input is received. For example, as the indicator progressively extends in the base direction from the base, the height for the object may be set to the height of the indicator when a specific input is received.

Determining whether an object can be generated in the base direction at the base may include determining whether there is another object (e.g., a non-movable object) above and/or below the base. This determination may be made for a predetermined distance below the surface at the base and a predetermined distance above the surface at the base.

The predetermined distance above the surface may be the set specific height of the object, or to the set specific height plus or minus another value (e.g., 12.5% or 6.25% of the specific height of the object). The predetermined distance below the surface may be a specific value or a percentage of the set specific height (e.g., 12.5% or 6.25% of the specific height of the object). Thus, the search length for the non-movable object at the base may be equal to or exceed the set specific height of the object, and/or the search length for the non-movable object may extend below the surface and/or above a height at which the object will be generated. In one embodiment, if the depth of the water at the location of the base does not exceed the predetermined distance below the surface (i.e., the ground surface below the water is less than the predetermined distance below the surface) then the determination may be made that the object cannot be generated at the location of the base.

In one embodiment, the object may be generated in the virtual space from a location below the surface (e.g., from a predetermined distance below the surface or from another surface below the upper surface). If the depth of the water at the base is in a specific range (e.g., between 0.25 m and 0.5 m), the object may be generated from a lower surface (e.g., ground) that is provided below the main surface (e.g., water surface) in the base direction. If the depth of the water (e.g., distance from the water surface to the ground surface below the water surface) at the base exceeds the range, the object may be generated from a specific depth below the main surface (e.g., 0.5 m) or from the main surface in the base direction.

Figure 20:
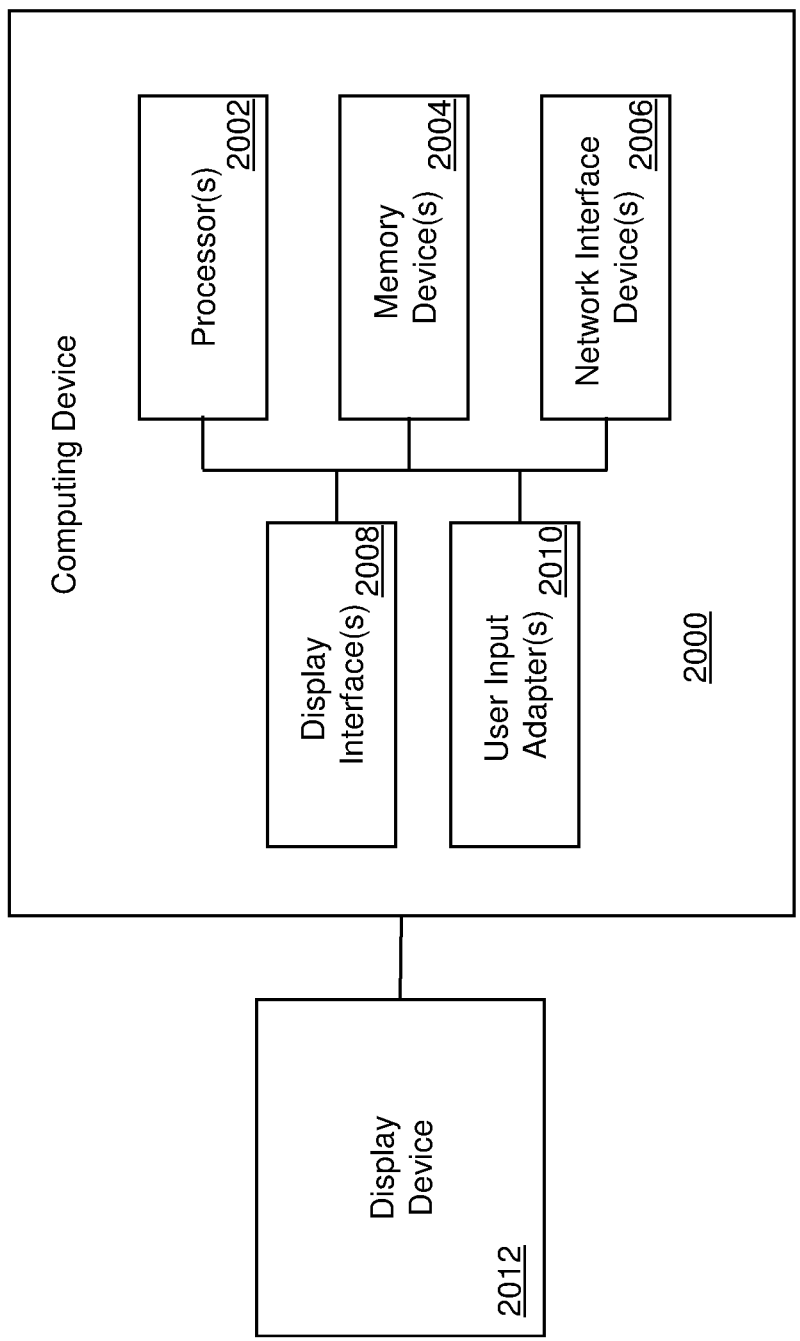
FIG. 20 is a generalized block diagram of a communication system according to a non-limiting example embodiment.

FIG. 20 is a block diagram of an example computing device 2000 (which may also be referred to, for example, as a "computing device," "computer system," or "computing system") according to some embodiments. In some embodiments, the computing device 2000 includes one or more of the following: one or more processors 2002; one or more memory devices 2004; one or more network interface devices 2006; one or more display interfaces 2008; and one or more user input adapters 2010. Additionally, in some embodiments, the computing device 2000 is connected to or includes a display device 2012. As will explained below, these elements (e.g., the processors 2002, memory devices 2004, network interface devices 2006, display interfaces 2008, user input adapters 2010, display device 2012) are hardware devices (for example, electronic circuits or combinations of circuits) that are configured to perform various different functions for the computing device 2000. For example, an application stored in memory devices 2004 may be executed by processors 2002 to generate images of a virtual space that are transmitted by the display interface 2008 to a display device 2012. Inputs to a controller may be received via user input adapters 2010 to control operation of the application. Such operations may change the position of the virtual camera in the virtual space and cause the processors 2002 to generate new images for display on the display device 2012.

In some embodiments, each or any of the processors 2002 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 2002 uses an instruction set architecture such as x86 or Advanced RISC Machine (ARM).

In some embodiments, each or any of the memory devices 2004 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 2002). Memory devices 2004 are examples of non-volatile computer-readable storage media.

In some embodiments, each or any of the network interface devices 2006 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 2008 is or includes one or more circuits that receive data from the processors 2002, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 2012, which displays the image data. Alternatively or additionally, in some embodiments, each or any of the display interfaces 2008 is or includes, for example, a video card, video adapter, or graphics processing unit (GPU).

In some embodiments, each or any of the user input adapters 2010 is or includes one or more circuits that receive and process user input data from one or more user input devices (not shown in FIG. 20) that are included in, attached to, or otherwise in communication with the computing device 2000, and that output data based on the received input data to the processors 2002. Alternatively or additionally, in some embodiments each or any of the user input adapters 2010 is or includes, for example, a PS/2 interface, a USB interface, a touchscreen controller, or the like; and/or the user input adapters 2010 facilitates input from user input devices (e.g., see FIG. 14) such as, for example, a keyboard, handheld controller, mouse, trackpad, touchscreen, and the like.

In some embodiments, the display device 2012 may be a Liquid Crystal Display (LCD) display, Light Emitting Diode (LED) display, or other type of display device. In embodiments where the display device 2012 is a component of the computing device 2000 (e.g., the computing device and the display device are included in a unified housing—See FIG. 14), the display device 2012 may be a touchscreen display or non-touchscreen display. In embodiments where the display device 2012 is connected to the computing device 2000 (e.g., is external to the computing device 2000 and communicates with the computing device 2000 via a wire and/or via wireless communication technology), the display device 2012 is, for example, an external monitor, projector, television, display screen, and the like.

In various embodiments, the computing device 2000 includes one, or two, or three, four, or more of each or any of the above-mentioned elements (e.g., the processors 2002, memory devices 2004, network interface devices 2006, display interfaces 2008, and user input adapters 2010). Alternatively or additionally, in some embodiments, the computing device 2000 includes one or more of: a processing system that includes the processors 2002; a memory or storage system that includes the memory devices 2004; and a network interface system that includes the network interface devices 2006.

The computing device 2000 may be arranged, in various embodiments, in many different ways. As just one example, the computing device 2000 may be arranged such that the processors 2002 include: a multi (or single)-core processor; a first network interface device (which implements, for example, WiFi, Bluetooth, NFC, etc. . . . ); a second network interface device that implements one or more cellular communication technologies (e.g., 3G, 4G LTE, CDMA, etc. . . . ); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 2000 may be arranged such that: the processors 2002 include two, three, four, five, or more multi-core processors; the network interface devices 2006 include a first network interface device that implements Ethernet and a second network interface device that implements WiFi and/or Bluetooth; and the memory devices 2004 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the information processing device 1400 or other devices described in the '022 application, each of which will be referred to individually for clarity as a "component" for the remainder of this paragraph, are implemented using an example of the computing device 2000 of FIG. 20. In such embodiments, the following applies for each component: (a) the elements of the computing device 2000 shown in FIG. 20 (i.e., the one or more processors 2002, one or more memory devices 2004, one or more network interface devices 2006, one or more display interfaces 2008, and one or more user input adapters 2010), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 2004 (e.g., in various embodiments, in a volatile memory device such as a RAM or an instruction register and/or in a non-volatile memory device such as a flash memory or hard disk) and all actions described herein as performed by the software modules are performed by the processors 2002 in conjunction with, as appropriate, the other elements in and/or connected to the computing device 2000 (i.e., the network interface devices 2006, display interfaces 2008, user input adapters 2010, and/or display device 2012); (c) alternatively or additionally, to the extent it is described herein that the component processes and/or otherwise handles data, in some embodiments, such data is stored in the memory devices 2004 (e.g., in some embodiments, in a volatile memory device such as a RAM and/or in a non-volatile memory device such as a flash memory or hard disk) and/or is processed/handled by the processors 2002 in conjunction, as appropriate, the other elements in and/or connected to the computing device 2000 (i.e., the network interface devices 2006, display interfaces 2008, user input adapters 2010, and/or display device 512); (d) alternatively or additionally, in some embodiments, the memory devices 2002 store instructions that, when executed by the processors 2002, cause the processors 2002 to perform, in conjunction with, as appropriate, the other elements in and/or connected to the computing device 2000 (i.e., the memory devices 2004, network interface devices 2006, display interfaces 2008, user input adapters 2010, and/or display device 512), each or any combination of actions described herein as performed by the component and/or by any software modules described herein as included within the component.

Although the processes illustrated and described herein include series of steps, it will be appreciated that the different embodiments of the present disclosure are not limited by the illustrated ordering of steps, as some steps may occur in different orders, some concurrently with other steps apart from that shown and described herein. In addition, not all illustrated steps may be required to implement a methodology in accordance with the present disclosure. Moreover, it will be appreciated that the processes may be implemented in association with the apparatus and systems illustrated and described herein as well as in association with other systems not illustrated.

Although example embodiments of the present disclosure have been illustrated and described hereinabove, the present disclosure is not limited to the above-mentioned specific example embodiments, but may be variously modified by those skilled in the art to which the present disclosure pertains without departing from the scope and spirit of the disclosure as disclosed in the accompanying claims. These modifications should also be understood to fall within the scope of the present disclosure.

What is claimed is:

1. An information processing apparatus comprising a processing system including at least one processor, the processing system being configured to control the information processing apparatus to at least:
   determine a base and a base direction in a virtual space;
   determine whether an object can be generated in the virtual space relative to the base in the base direction;
   based on determining that the object can be generated in the virtual space relative to the base in the base direction, display an animated indicator indicating at least a size of the object and the base direction for generating the object in the virtual space, wherein the indicator comprises a repeated animation in which the indicator progressively extends from the base in the base direction until extended in the base direction for a distance corresponding to a dimension in the base direction of the object to be generated; and
   based on determining that a specified condition is satisfied, progressively generate the object relative to the base in the base direction.

2. The information processing apparatus of claim 1, wherein the base is determined based on an intersection location of an imaging axis of a virtual camera provided in the virtual space and a surface in the virtual space.

3. The information processing apparatus of claim 2, wherein location and/or orientation of the virtual camera is controlled based on location and/or orientation of a virtual character in the virtual space and/or inputs for controlling the virtual camera.

4. The information processing apparatus of claim 2, wherein the processing system is further configured to, based on determining that the object cannot be generated relative to the base in the base direction, display the indicator, without animation indicating the base direction, at the intersection location of the imaging axis of the virtual camera and the surface.

5. The information processing apparatus of claim 1, wherein the base is a base point or a base plane.

6. The information processing apparatus of claim 5, wherein the indicator is an arrow dynamically extending from the base point or the base plane in the base direction.

7. The information processing apparatus of claim 1, wherein the indicator is a pillar or a sphere displayed increasing in size from the base in the base direction.

8. The information processing apparatus of claim 1, wherein the processing system is further configured to control the information processing apparatus to: determine whether the object to be generated relative to the base will collide with a non-movable object in the virtual space, and determine that the object cannot be generated relative to the base in the base direction based on determining that the object to be generated relative to the base will collide with the non-movable object in the virtual space.

9. The information processing apparatus of claim 1, wherein the processing system is further configured to control the information processing apparatus to, upon the object being generated colliding with another object in the virtual space, move the other object according to the object being generated in the base direction.

10. The information processing apparatus of claim 1, wherein the processing system is further configured to control the information processing apparatus to, upon the object being generated colliding with another object in the virtual space that is not movable, stop the generating of the object and remove the object being generated from the virtual space.

11. The information processing apparatus of claim 1, wherein the processing system is further configured to control the information processing apparatus to:
   in response to a specific input, enter an object generating mode; and
   upon entering the object generating mode, change color, brightness, or texture of a surface on which the object can be generated.

12. The information processing apparatus of claim 1, wherein the object is a rectangular prism and the indicator includes a shape that corresponds to the shape of the rectangular prism, and the processing system is further configured to control the information processing apparatus to determine an orientation for the rectangular prism such that two opposite sides of a top surface of the rectangular prism are parallel to a horizontal component of an imaging axis of a virtual camera in the virtual space, and generate the object having the determined orientation.

13. The information processing apparatus of claim 1, wherein the processing system is further configured to control the information processing apparatus to move the indicator in the virtual space according to movement of the base, and determine that the specified condition is satisfied when user instructions to generate the object are received.

14. The information processing apparatus of claim 1, wherein the indicator indicates a position of the object to be generated in the virtual space.

15. The information processing apparatus of claim 1, wherein determining whether the object can be generated in the virtual space includes determining whether the base in the virtual space is located on a surface having a characteristic permitting the object to be generated, and a determination is made that the object can be generated relative to the base in the base direction when the base is located on the surface having the characteristic permitting the object to be generated.

16. The information processing apparatus of claim 15, wherein the determination is made that the object cannot be generated relative to the base in the base direction when the base is located on a surface without a characteristic permitting the object to be generated.

17. A information processing system comprising:
   a display; and
   a computer including at least one processor, the computer being configured to control the information processing system to at least:
      display, on the display, an image of a virtual space;
      determine a base and a base direction in the virtual space;

determine whether an object can be generated in the virtual space relative to the base in the base direction;

based on determining that the object can be generated in the virtual space relative to the base in the base direction, display, on the display, an animated indicator indicating at least a size of the object and the base direction for generating the object in the virtual space, wherein the indicator comprises a repeated animation in which the indicator progressively extends from the base in the base direction until extended in the base direction for a distance corresponding to a dimension in the base direction of the object to be generated; and based on determining that a specified condition is satisfied, progressively generate the object relative to the base in the base direction.

18. The system according to claim 17, wherein the base is determined based on an intersection location of an imaging axis of a virtual camera provided in the virtual space and a surface in the virtual space, and the location of the base is changed in response to changes in the location and/or orientation of the virtual camera.

19. The system according to claim 17, wherein the object is a rectangular prism and the indicator includes a shape that corresponds to the shape of the rectangular prism, and the computer is further configured to control the information processing system to determine an orientation for the rectangular prism such that two opposite sides of a top surface of the rectangular prism are parallel to a horizontal component of an imaging axis of a virtual camera in the virtual space, and generate the object having the determined orientation.

20. A method implemented at least in part by at least one computer including a processor, the method comprising:
determining a base and a base direction in a virtual space;
determining whether an object can be generated in the virtual space relative to the base in the base direction;
based on determining that the object can be generated in the virtual space relative to the base in the base direction, displaying an animated indicator indicating at least a size of the object and the base direction for generating the object in the virtual space, wherein the indicator comprises a repeated animation in which the indicator progressively extends from the base in the base direction until extended in the base direction for a distance corresponding to a dimension in the base direction of the object to be generated; and
based on determining that a specified condition is satisfied, progressively generating the object relative to the base in the base direction.

21. The method according to claim 20, wherein the base is determined based on an intersection location of an imaging axis of a virtual camera provided in the virtual space and a surface in the virtual space, and the location of the base is changed in response to changes in the location and/or orientation of the virtual camera.

22. The method according to claim 20, wherein the object is a rectangular prism and the indicator includes a shape that corresponds to the shape of the rectangular prism, and the method further include determining an orientation for the rectangular prism such that two opposite sides of a top surface of the rectangular prism are parallel to a horizontal component of an imaging axis of a virtual camera in the virtual space, and generating the object having the determined orientation.

23. A non-transitory computer-readable medium storing a program causing an information processing device to at least:
determine a base and a base direction in a virtual space;
determine whether an object can be generated in the virtual space relative to the base in the base direction;
based on determining that the object can be generated in the virtual space relative to the base in the base direction, display an animated indicator indicating at least a size of the object and the base direction for generating the object in the virtual space, wherein the indicator comprises a repeated animation in which the indicator progressively extends from the base in the base direction until extended in the base direction for a distance corresponding to a dimension in the base direction of the object to be generated; and
based on determining that a specified condition is satisfied, progressively generate the object relative to the base in the base direction.

24. The non-transitory computer-readable medium according to claim 23, wherein the base is determined based on an intersection location of an imaging axis of a virtual camera provided in the virtual space and a surface in the virtual space, and the location of the base is changed in response to changes in the location and/or orientation of the virtual camera.

* * * * *